(12) United States Patent
Alofs et al.

(10) Patent No.: US 10,899,370 B2
(45) Date of Patent: Jan. 26, 2021

(54) PANELING MODULES FOR VEHICLES

(71) Applicant: SIEMENS MOBILITY GMBH, Munich (DE)

(72) Inventors: Ludger Alofs, Krefeld (DE); Reinhold Belzer, Adelsdorf (DE); Adrian Biadatz, Krefeld (DE); Martin Dombrowsky, Cologne (DE); Joshua Hesterberg, Mettmann (DE); Michael Kiesel, Sacramento, CA (US); Sascha Kirchhoff, Krefeld (DE); Mirko Schwozer, Hoechstadt (DE); Helmut Treutler, Krefeld (DE); Guenter Wolf, Nuremberg (DE)

(73) Assignee: Siemens Mobility GmbH, Munich (DE)

( * ) Notice: Subject to any disclaimer, the term of this patent is extended or adjusted under 35 U.S.C. 154(b) by 242 days.

(21) Appl. No.: 16/089,668

(22) PCT Filed: Mar. 1, 2017

(86) PCT No.: PCT/EP2017/054699
§ 371 (c)(1),
(2) Date: Sep. 28, 2018

(87) PCT Pub. No.: WO2017/167524
PCT Pub. Date: Oct. 5, 2017

(65) Prior Publication Data
US 2020/0307653 A1 Oct. 1, 2020

(30) Foreign Application Priority Data
Mar. 31, 2016 (DE) .......................... 10 2016 205 379

(51) Int. Cl.
*B61D 17/08* (2006.01)
*B61D 19/00* (2006.01)
(Continued)

(52) U.S. Cl.
CPC ............. *B61D 17/08* (2013.01); *B61D 17/06* (2013.01); *B61D 17/12* (2013.01); *B61D 19/005* (2013.01); *B61D 37/003* (2013.01)

(58) Field of Classification Search
CPC ........ B61D 17/06; B61D 17/12; B61D 17/18; B61D 19/005; B61D 37/003;
(Continued)

(56) References Cited

U.S. PATENT DOCUMENTS 3,188,131 A * 6/1965 Attwood .............. B62D 33/046
52/270
4,283,086 A * 8/1981 Morin .................... B62D 27/04
296/178
(Continued)

FOREIGN PATENT DOCUMENTS

EP 1749733 A2 2/2007
EP 2524856 A1 11/2012
(Continued)

*Primary Examiner* — Jason C Smith
(74) *Attorney, Agent, or Firm* — Laurence Greenberg; Werner Stemer; Ralph Locher

(57) ABSTRACT

A vehicle, in particular a rail vehicle, has cladding modules for cladding a body shell-side vehicle lateral wall and/or vehicle roof. The cladding modules, or at least a majority of the cladding modules of the vehicle, either have a first width or a second width which is smaller than the first width, and the difference between the first and second width corresponds to half of the width of at least one partition module which is mounted in the vehicle and which is mounted between two of the cladding modules or is arranged on an interface between two directly adjacent cladding modules, in particular the partition module is placed in front of the interface when seen in the vehicle transverse direction and covers the interface.

15 Claims, 5 Drawing Sheets

(51) Int. Cl.
*B61D 37/00* (2006.01)
*B61D 17/12* (2006.01)
*B61D 17/06* (2006.01)

(58) Field of Classification Search
CPC ............ B60R 2013/0293; B60R 13/00; B62D 33/046; B62D 63/025
See application file for complete search history.

(56) References Cited

U.S. PATENT DOCUMENTS

| | | | | |
|---|---|---|---|---|
| 5,066,067 | A * | 11/1991 | Ferdows | B60P 3/32 296/193.04 |
| 6,685,254 | B2 * | 2/2004 | Emmons | B60G 7/02 296/178 |
| 7,832,792 | B2 * | 11/2010 | Fillion | B62D 33/044 296/178 |
| 7,958,831 | B2 * | 6/2011 | Campus | B61D 17/045 105/396 |
| 8,056,958 | B2 * | 11/2011 | Oriet | B60R 21/13 296/178 |
| 10,086,891 | B2 * | 10/2018 | Hung | B62D 63/025 |
| 10,464,617 | B2 * | 11/2019 | Findley | B62D 31/025 |
| 2005/0161975 | A1 * | 7/2005 | Nieminski | B62D 31/025 296/178 |
| 2005/0235819 | A1 * | 10/2005 | Long | F41H 5/24 89/36.07 |
| 2011/0017527 | A1 * | 1/2011 | Oriet | B62D 21/14 180/65.1 |

FOREIGN PATENT DOCUMENTS

| | | | | |
|---|---|---|---|---|
| GB | 2515647 | A * | 12/2014 | ........... B62D 63/025 |
| GB | 2515647 | A | 12/2014 | |
| RU | 80420 | U1 | 2/2009 | |
| RU | 91319 | U1 | 2/2010 | |

* cited by examiner

PANELING MODULES FOR VEHICLES

BACKGROUND OF THE INVENTION

Field of the Invention

The invention relates to vehicles, in particular rail vehicles, which are lined with paneling modules.

The interior finishing of modern passenger trains in terms of the arrangement and configuration of seating, luggage space and internal divisions of the vehicle interior is undertaken primarily with a view to passenger requirements. Nowadays this makes the required numbers of various interior paneling components considerable, in particular owing to the individual internal division in the vehicle interior and to the variable arrangement of partition modules, so that the outlay and the costs associated with the vehicle interior paneling can be considerable simply due to the internal division.

SUMMARY OF THE INVENTION

The object of the invention therefore is to specify a vehicle, in particular a rail vehicle, which is especially easy and inexpensive to produce.

According to the invention this object is achieved by a vehicle having the features as claimed. Advantageous embodiments of the vehicle according to the invention are described in dependent claims.

Accordingly, it is proposed according to the invention that the paneling modules or at least a majority of the paneling modules of the vehicle have either a first width or a second width, which is smaller than the first width, wherein the difference in width between the first and second width corresponds to half of the width of at least one partition module which is fitted in the vehicle and which is fitted between two paneling modules or is arranged at the interface between two paneling modules directly adjoining one another, in particular which is placed in front of the interface, viewed in the vehicle transverse direction, and which covers the interface.

A substantial advantage of the vehicle according to the invention lies in the fact that the paneling modules are standardized in terms of their width, specifically with a view to the problems of internal division described above. By matching the first and second width to the width of the partition modules it can be ensured that paneling is always possible using paneling modules of the first and/or second width, irrespective of whether or not partition modules are present in the particular vehicle section to be lined, or at which locations partition modules are provided.

It is advantageous if the majority of the partition modules, preferably all partition modules, have the same width, hereinafter referred to as the partition module width.

The paneling modules may be side wall modules, for example. A luggage rack module and/or a side roof module is preferably fitted above each of the majority of side wall modules, preferably above all side wall modules.

It is particularly advantageous if the luggage rack modules and/or side roof modules each have the first or the second width; in sections of the vehicle without partition modules the width of the luggage rack modules and/or the side roof modules in each case corresponds to the width of the side wall module situated below them, and there the respective left-hand and right-hand edges of the luggage rack modules and/or side roof modules align with the left-hand and right-hand edges of the side wall modules situated below them.

In sections of the vehicle equipped with a partition it is advantageous if the partition modules or at least the majority of partition modules are each spatially arranged—viewed looking outwards in a vehicle transverse direction—in front of the interface between two directly adjoining side wall modules of the first width and cover the interface, and the luggage rack modules and/or side roof modules situated above these two adjoining side wall modules each have the second width.

The vehicle ceiling is preferably lined—exclusively or at least predominantly—with such ceiling modules, in particular multivent ceiling modules, the module width of which corresponds to one of the widths:
the abovementioned first width,
the abovementioned second width,
a third width, which corresponds to half of the difference between the first width and the partition module width, or
a fourth width, which corresponds to the first width minus half of the difference between the first and second width.

It is particularly advantageous with regard to the ceiling panels if all ceiling modules of the first width or at least the majority of ceiling modules of the first width are arranged centrally over the interface between two adjoining side wall modules having the first width, all ceiling modules of the second width or at least the majority of ceiling modules of the second width are arranged centrally over the interface between two adjoining side wall modules having the second width, all ceiling modules of the third width or at least the majority of ceiling modules of the third width are each arranged in pairs, wherein each pair encloses a partition module or a monitor module between them, and each pair is arranged centrally over the interface between two adjoining side wall modules having the first width, and all ceiling modules of the fourth width or at least the majority of ceiling modules of the fourth width are arranged centrally over the interface between a side wall module having the first width and an adjoining side wall module having the second width.

The partition modules, the monitor modules and/or the ceiling modules are preferably fitted, in particular attached to a ceiling framework extending through the vehicle in a longitudinal direction and fitted in the roof area or integrated in the roof area.

Interior ceiling containers are preferably fitted to the or at least one ceiling framework, extending through the vehicle in a longitudinal direction and fitted in the roof area or integrated in the roof area, wherein each interior ceiling container is assigned to a ceiling module and in each case at the same location—viewed in a vehicle longitudinal direction—where the associated ceiling module is fitted, and the width of each of the interior ceiling containers is identical to the width of the associated ceiling module.

The ceiling framework is preferably formed by a profile or a profile structure, in particular an extruded profile or an extruded profile structure.

It is seen as advantageous with regard to the partition modules if the majority of those partition modules which are interior door modules, or all interior door modules are wider—viewed in a vehicle transverse direction—than the interior door held inside the module by a door retaining device, and the door retaining device arranged inside the module is designed in such a way that in fitting the interior door it is possible to displace the interior door in a vehicle longitudinal direction inside the interior door module without displacing the interior door module as such.

It is advantageous, for example, if the door retaining device is fitted to the ceiling framework fitted in the roof area or integrated in the roof area and the interior door, preferably including the door drive, is displaceable on the ceiling framework in a vehicle longitudinal direction.

The term majority as employed in the explanations above preferably amounts to at least 50% of the respective reference figure or quantity, preferably at least 75% and more preferably at least 90%.

The invention furthermore relates to a method for paneling a vehicle bodyshell side wall and/or the vehicle ceiling of a vehicle, in particular a rail vehicle, with a plurality of paneling modules.

According to the invention it is proposed, with regard to such a method, that the paneling modules used for paneling are exclusively or at least predominantly paneling modules which have either a first width or a second width, which is smaller than the first width, wherein the difference in width between the first and second width corresponds to half of the width of at least one partition module which is fitted in the vehicle and which is fitted between two of the paneling modules.

With regard to the advantages of the method according to the invention reference should be made to the remarks above in connection with the advantages of the vehicle according to the invention.

The invention further relates to a set of paneling modules which is suited to the paneling of a vehicle bodyshell side wall and/or a vehicle bodyshell ceiling. According to the invention it is proposed, with regard to such a set, that the set comprise paneling modules of a first width and a second width which is smaller than the first width, wherein the difference in width between the first and second width corresponds to half of the width of at least one partition module, which can be fitted between two of the paneling modules or which can be arranged at the interface between two paneling modules directly adjoining one another, in particular which can be placed in front of the interface, viewed in the vehicle transverse direction, and which is capable of covering the interface.

With regard to the advantages of the set according to the invention reference should be made to the remarks above in connection with the advantages of the vehicle according to the invention.

BRIEF DESCRIPTION OF THE SEVERAL VIEWS OF THE DRAWING

The invention is explained in more detail below, referring to exemplary embodiments; here by way of example.

For the sake of clarity, in the figures the same reference numerals are always used for identical or comparable components.

FIG. 1 shows an exemplary embodiment of a set 10 of paneling modules which are suitable for the interior paneling of a vehicle.

DESCRIPTION OF THE INVENTION

The set 10 comprises side wall modules SWM1, which have a first width B1 and a height H. The thickness of the side wall modules SWM1 extends into the perspective plane in FIG. 1.

The set 10 also comprises, luggage rack modules GM1 and side roof modules SDM1, which likewise each have the predefined first width B1.

The set 10 also includes side wall modules SWM2, luggage rack modules GM2 and side roof modules SDM2, which each have a predefined second width B2.

The difference in width between the first width B1 and the second width B2 corresponds to half of the width of at least one partition module fitted in the vehicle; an exemplary embodiment of such a partition module is shown further down and explained in more detail in connection with FIGS. 2, 4 and 5. Here therefore:

$$B2=B1-B/2,$$

where B1 is the first width, B2 is the second width and B is the width of the partition module.

In addition, the set 10 comprises multivent ceiling modules LDM1, LDM2, LDM3 and LDM4.

The multivent ceiling modules LDM1 and LDM2 have the first width B1 or the second width B2.

The multivent ceiling modules LDM3 have a third width B3 which corresponds to half of the difference between the first width B1 and the width B of the partition module. Here therefore:

$$B3=(B1-B)/2.$$

The multivent ceiling modules LDM4 have a fourth width B4, which corresponds to the first width B1 minus half of the difference between the first width and second width B1 and B2. Here therefore:

$$B4=B1-(B1-B2)/2=(B1+B2)/2.$$

Figure 1:
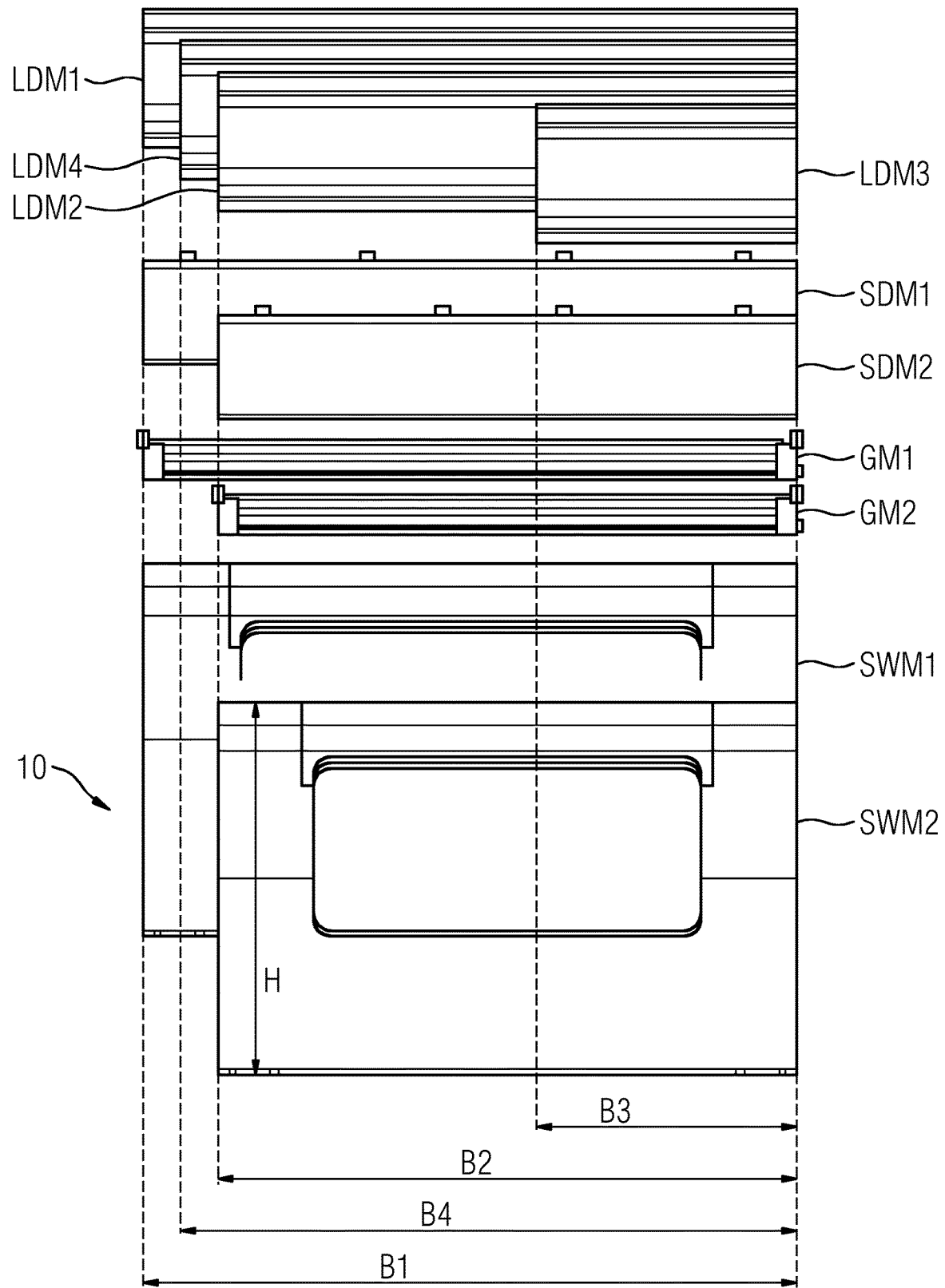
FIG. 1 shows an exemplary embodiment of a set of paneling modules which serve for the paneling of a vehicle bodyshell side wall and a vehicle bodyshell ceiling.
Figure 2:
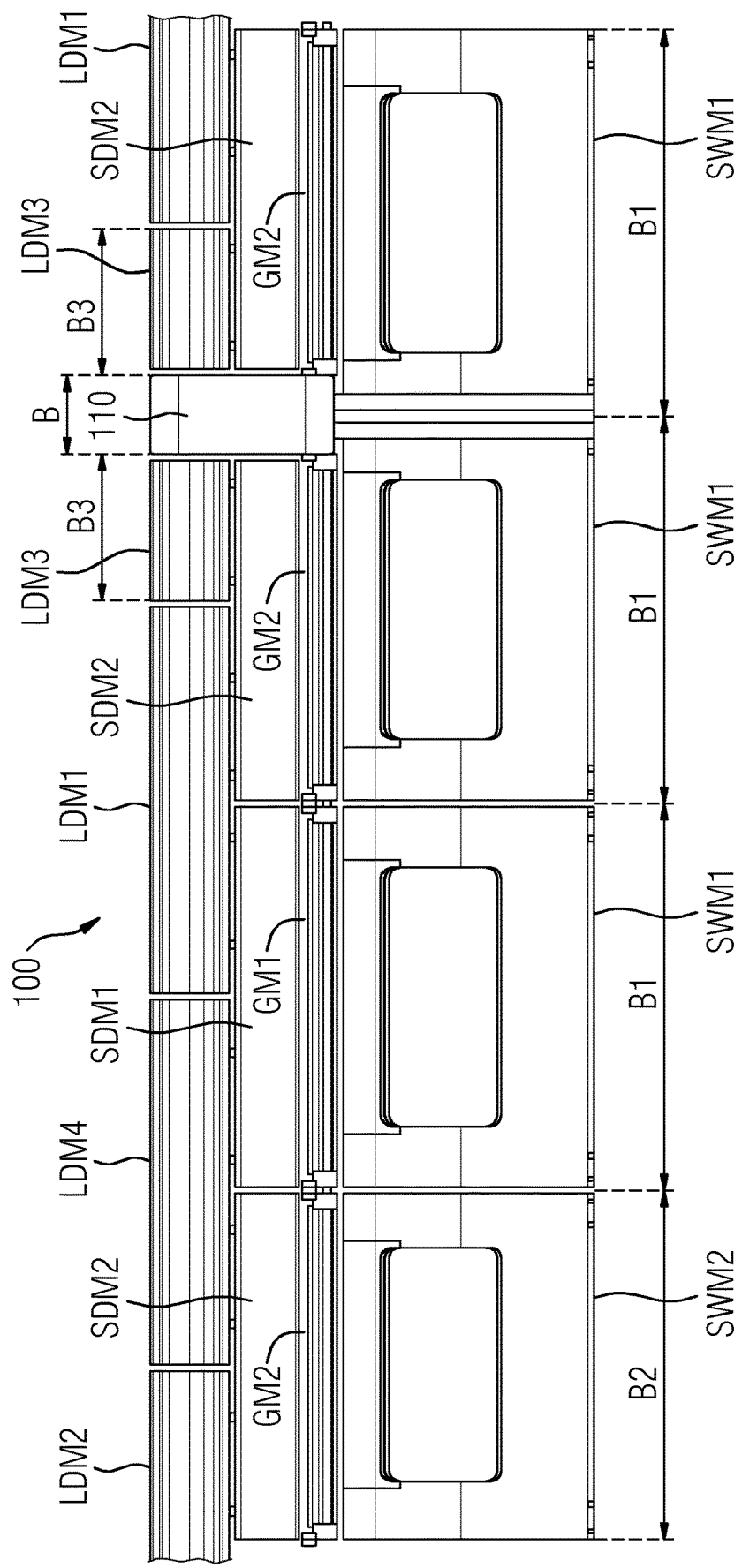
FIG. 2 shows a portion of an exemplary embodiment of a rail vehicle, which is lined with paneling modules from the set of paneling modules according to FIG. 1.

FIG. 2 by way of example shows a portion of a rail vehicle 100, which is lined with paneling modules from the set 10 according to FIG. 1. FIG. 2 here shows a view of the vehicle interior—in the vehicle transverse direction—looking towards the side wall of the rail vehicle 100.

The arrangement of each of the multivent ceiling modules LDM1 to LDM4 is centrally offset in relation to the side wall modules situated below them, that is centrally in such a way that the left-hand and right-hand edges of each of the multivent ceiling modules lie above the center of the side wall modules situated below them.

FIG. 2 also shows that a partition module 110 may be arranged in front of the interface between two directly adjoining side wall modules, which have the first width B1. The partition module 110 has a partition module width B.

If such a partition module 110 is provided, the luggage rack modules GM2 and the side roof modules SDM2 there each preferably have the second width B2.

This choice of width ensures that with their outer edges remote from the partition module 110 the luggage rack modules and the side roof modules each align over the outer edges of the lower side wall modules remote from the partition module 110, without the need for any manual finishing of the modules.

With regard to the multivent ceiling modules, it can be seen in FIG. 2 that those multivent ceiling modules which are separated from one another by a partition module 110 have the third width B3. The third width B3 of the multivent ceiling modules ensures that with their outer edges remote from the partition module 110 the multivent ceiling modules are arranged centrally over the side wall modules situated below them, without the need for any manual finishing of the modules.

It can also be seen from FIG. 2 that in portions of the vehicle in which there is no partition module present the luggage rack modules and the side roof modules each have the same width as the side wall modules situated below them and align with these with their left-hand and right-hand edges respectively.

Figure 3:
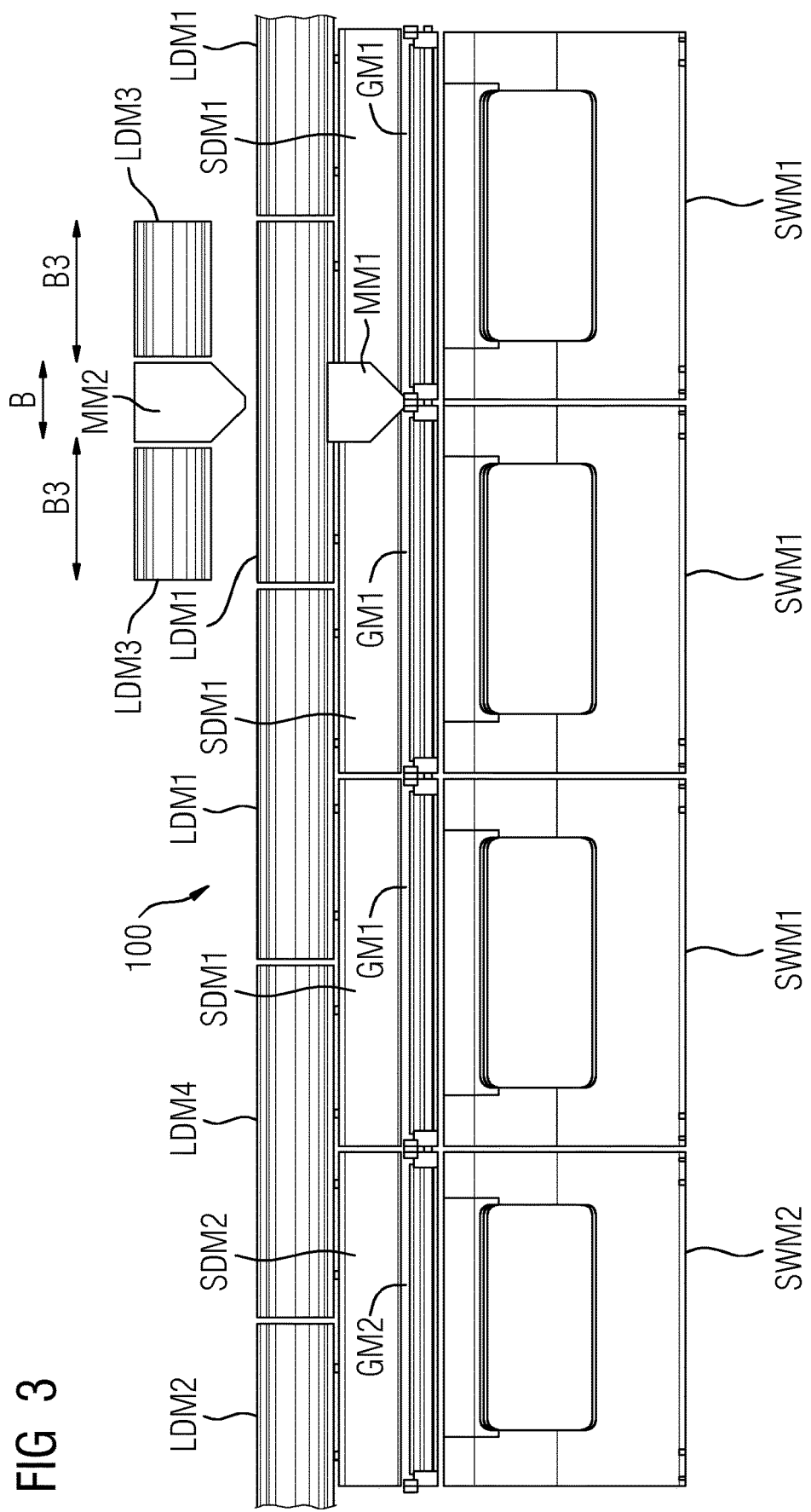
FIG. 3 shows another lined portion of the rail vehicle according to FIG. 2.

FIG. 3 by way of example shows that a monitor module MM1 may be arranged in front of the interface between two adjoining side roof modules. If such a monitor module is placed in front of the interface, the width of the side roof modules and the multivent ceiling modules there remains unchanged.

Alternatively, it is possible to integrate a monitor module, such as the monitor module MM2 according to FIG. 3, for example, between two adjoining multivent ceiling modules LDM3. In the case of such a spatial integration the multivent ceiling modules preferably have the third width B3, in order to ensure that each of the outer edges or those remote from the monitor module MM2 are arranged over the center of the side wall modules situated below them, as has already been explained above in connection with FIG. 2, without the need for manual finishing of the modules.

Figure 4:
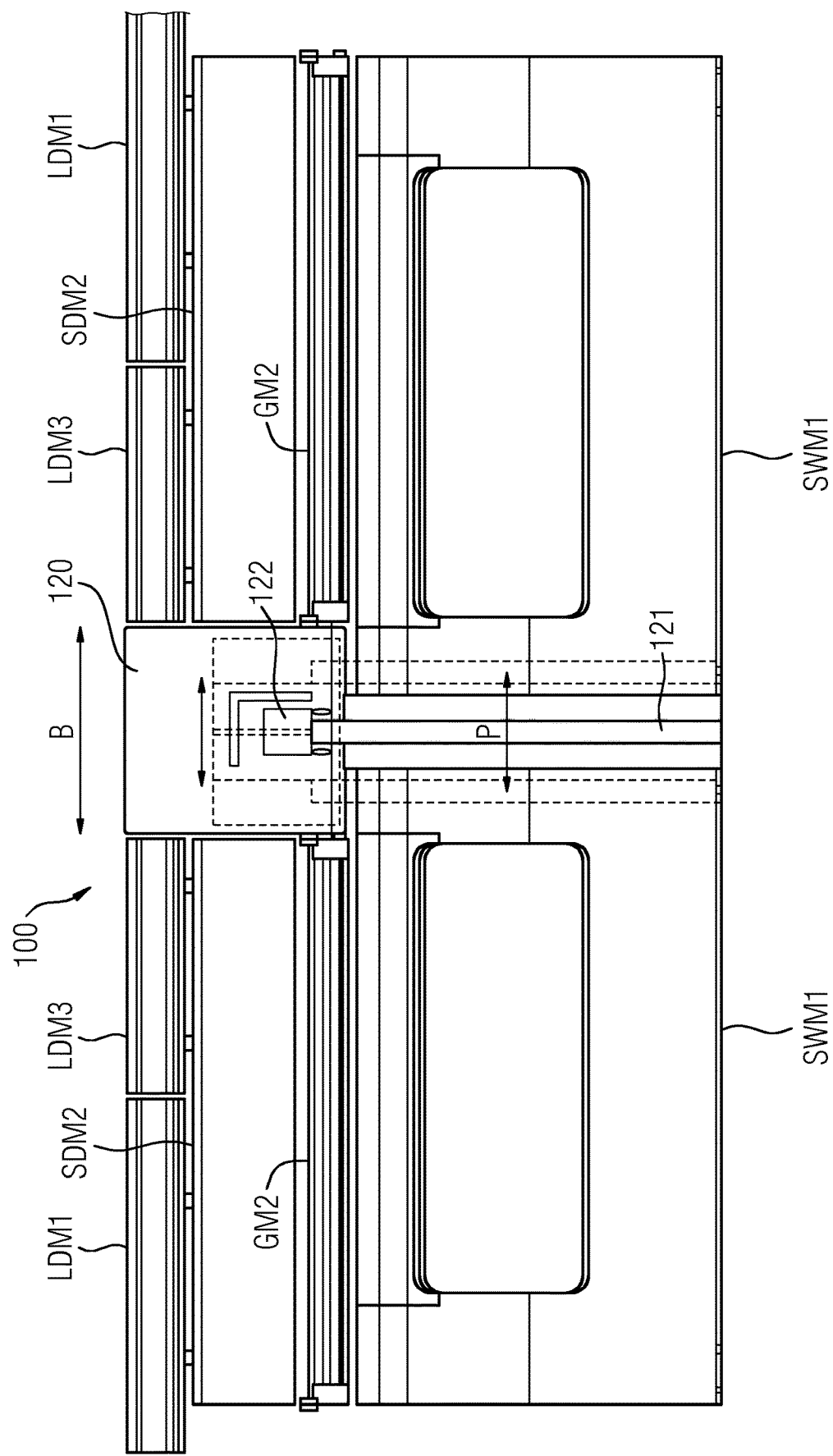
FIG. 4 shows, in more detail, an exemplary embodiment of an interior door module, which can be used as partition module in a rail vehicle according to FIGS. 2 and 3.

FIG. 4 shows an exemplary embodiment of an interior door module 120, which can be used as partition module 110 according to FIG. 2. The interior door module 120 comprises an interior door 121, which is held by a door retaining device 122.

FIG. 4 shows that the width B of the interior door module 120 is significantly greater than the width of the interior door 121. The door retaining device 122 is designed in such a way that in fitting the interior door it is possible to displace the interior door 121 in the direction of the arrow P or in a vehicle longitudinal direction inside the interior door module 120 without making it necessary to displace the entire the interior door module 120 inside the vehicle. In other words, it is therefore possible first to install the interior door module 120 together with the other paneling modules and only later to fix the ultimate position of the interior door 121 inside the interior door module 120.

Figure 5:
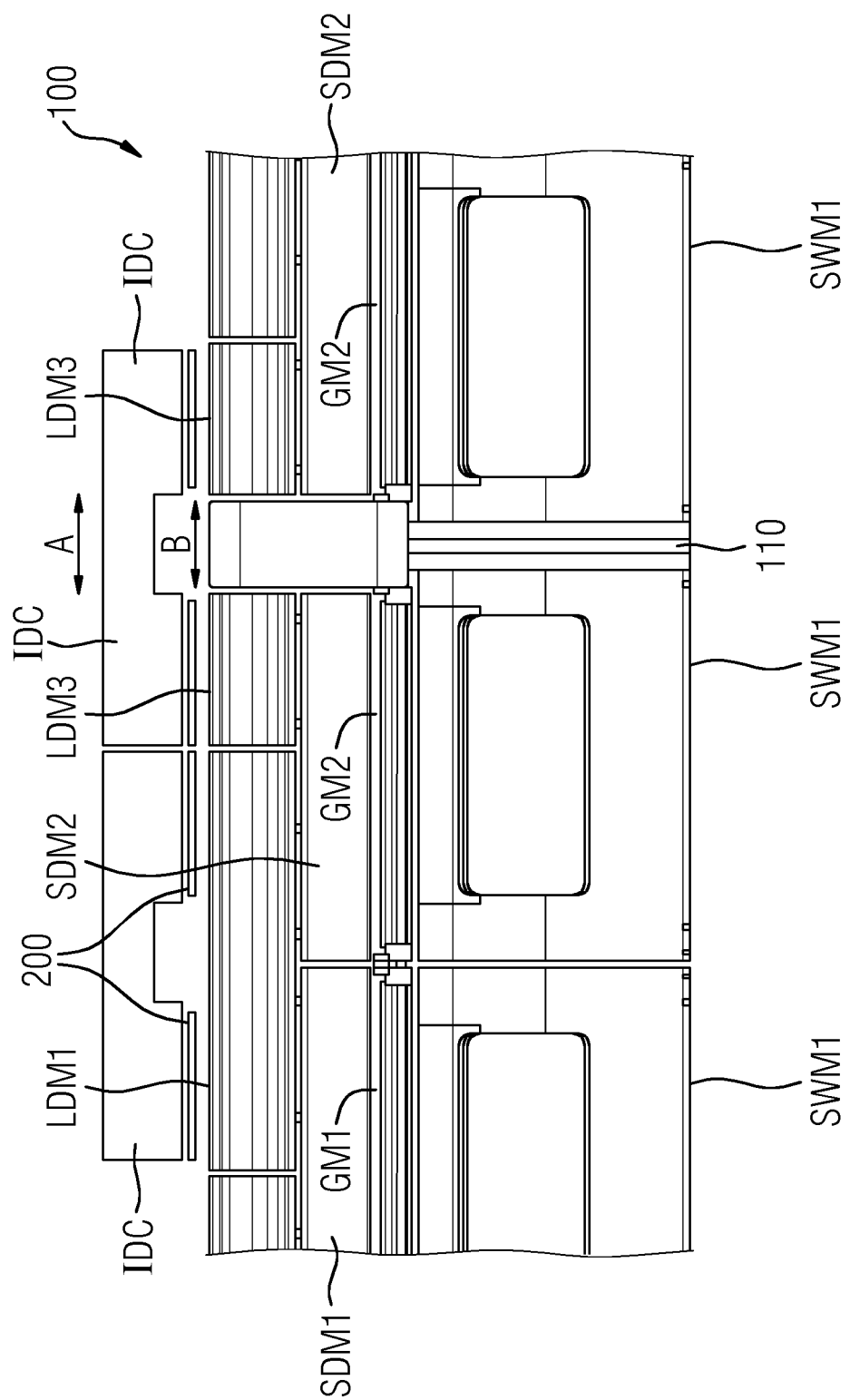
FIG. 5 shows an exemplary embodiment of the paneling of a rail vehicle in which interior ceiling containers are additionally provided.

FIG. 5 shows an exemplary embodiment of a rail vehicle 100, in which interior ceiling containers IDC are additionally provided. The interior ceiling containers IDC each have two lids 200, spaced at a distance A from one another. The distance A is at least as large as the width B of the partition modules 110 according to FIG. 2 or the interior door modules 120 according to FIG. 4, in order to allow the lids 200 to open and close irrespective of whether or not a partition module 110 or an interior door module 120 is installed below them.

Although the invention has been more fully illustrated and described in detail through preferred exemplary embodiments, the invention is not limited by the examples disclosed and other variants may be inferred from these by the person skilled in the art without departing from the scope of the invention.

The invention claimed is:

1. A vehicle, comprising:
a vehicle bodyshell having a side wall and a vehicle ceiling;
a plurality of paneling modules for paneling at least one of said vehicle ceiling or said side wall, said plurality of paneling modules including side wall modules, luggage rack modules, and/or a side roof module fitted above each of said side wall modules;
said side wall modules, said luggage rack modules and/or said side roof modules each having a first width or a second width smaller than the first width;
a partition module fitted in the vehicle and having a given width;
a difference in width between the first and second widths equals one half of the given width of said partition module fitted between two of said luggage rack modules and/or side roof modules of the second width and being arranged at an interface between two directly adjacent side wall modules of the first width, said partition module being placed in front of and covering the interface between said side wall modules of the first width, as viewed in a vehicle transverse direction.

2. The vehicle according to claim 1, wherein said vehicle is a rail vehicle.

3. The vehicle according to claim 1, wherein a majority of said partition modules, or all of said partition modules, have a common width.

4. The vehicle according to claim 1, wherein:
in sections of the vehicle without partition modules:
said luggage rack modules and/or said side roof modules in each case has a width corresponding to the width of said side wall module disposed therebelow; and
respective left-hand edges and right-hand edges of said luggage rack modules and/or side roof modules align with left-hand edges and right-hand edges of said side wall modules disposed therebelow.

5. The vehicle according to claim 1, wherein:
said vehicle ceiling is lined, at least predominantly, with ceiling modules having a width corresponding to one of the following widths:
the first width;
the second width;
a third width equal to one half of a difference between the first width and the given width of said partition module; or
a fourth width equal to the first width minus one half of a difference between the first and second widths.

6. The vehicle according to claim 5, wherein said ceiling modules are multivent ceiling modules.

7. The vehicle according to claim 5, wherein:
at least a majority of said ceiling modules, or all of said ceiling modules, of the first width are arranged centrally over said interface between two adjoining said side wall modules having the first width;
at least a majority of said ceiling modules, or all of said ceiling modules, of the second width are arranged centrally over said interface between two adjoining said side wall modules having the second width;
at least a majority of said ceiling modules, or all of said ceiling modules, of the third width are arranged in pairs, with each pair enclosing a partition module or a monitor module therebetween, and each pair being arranged centrally over said interface between two adjoining said side wall modules having the first width; and at least the majority of said ceiling modules, or all of said ceiling modules, of the fourth width are arranged centrally over said interface between a side wall module having the first width and an adjoining said side wall module having the second width.

8. The vehicle according to claim 7, which comprises a ceiling framework extending through the vehicle in a longitudinal direction and fitted in a roof area or integrated in a roof area of the vehicle, and wherein said partition modules, said monitor modules and/or said ceiling modules are fitted to said ceiling framework.

9. The vehicle according to claim 1, which comprises:
a ceiling framework extending through the vehicle in a longitudinal direction and fitted in a roof area or integrated in a roof area of the vehicle;
interior ceiling containers fitted to said ceiling framework, each interior ceiling container being assigned to a ceiling module and in each case at the same location, viewed in a vehicle longitudinal direction, where an associated said ceiling module is fitted and a width of each of said interior ceiling containers is identical to the width of the associated said ceiling module.

10. The vehicle according to claim 1, which comprises a ceiling framework extending through the vehicle in a longitudinal direction and fitted in a roof area or integrated in a roof area of the vehicle, said ceiling framework being a profile or a profile structure.

11. The vehicle according to claim 10, wherein said ceiling framework is an extruded profile or an extruded profile structure.

12. The vehicle according to claim 1, which comprises interior doors and door retaining devices holding said interior doors in respective said partition modules being interior door modules, and wherein:
a majority of said interior door modules, or all of said interior door modules, are wider, viewed in a vehicle transverse direction, than a respective said interior door held inside the respective said module; and
said door retaining device arranged inside the respective said module is configured such that, while fitting said interior door it is possible to displace said interior door in a vehicle longitudinal direction inside the interior door module without displacing said interior door module.

13. The vehicle according to claim 12, wherein said door retaining device is fitted to said ceiling framework and said interior door, and optionally a door drive, are displaceable on said ceiling framework in a vehicle longitudinal direction.

14. A method of paneling a vehicle bodyshell side wall and/or a vehicle ceiling of a vehicle, the method comprising:
providing a plurality of paneling modules including side wall modules, luggage rack modules, and/or a side roof module fitted above each of the side wall modules, the side wall modules, the luggage rack modules and/or the side roof modules each having a first width or a second width smaller than the first width;
fitting a partition module of a given width between two of the luggage rack modules and/or side roof modules of the second width in the vehicle;
a difference in width between the first width and the second width equals one half of the given width of the partition module;
arranging the luggage rack modules and/or side roof modules of the second width at an interface between two directly adjacent side wall modules of the first width, the partition module being placed in front of and covering the interface between the directly adjacent side wall modules of the first width, as viewed in a vehicle transverse direction; and
paneling the side wall and/or the vehicle ceiling with the paneling modules and the partition module.

15. The method according to claim 14, wherein the vehicle is a rail vehicle.

* * * * *